(12) United States Patent
Park et al.

(10) Patent No.: US 7,965,355 B2
(45) Date of Patent: Jun. 21, 2011

(54) TRANSREFLECTIVE LIQUID CRYSTAL DISPLAY AND METHOD OF MANUFACTURING THE SAME

(75) Inventors: Kuhyun Park, Uiwang-si (KR); Jonghwae Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 118 days.

(21) Appl. No.: 12/201,624

(22) Filed: Aug. 29, 2008

(65) Prior Publication Data
US 2009/0059135 A1 Mar. 5, 2009

(30) Foreign Application Priority Data
Aug. 31, 2007 (KR) .......................... 10-2007-0088458

(51) Int. Cl.
*G02F 1/1335* (2006.01)

(52) U.S. Cl. ........ 349/108; 349/106; 349/107; 349/113; 349/114

(58) Field of Classification Search .......... 349/106–108, 349/113, 114
See application file for complete search history.

(56) References Cited

U.S. PATENT DOCUMENTS

| 5,757,452 | A * | 5/1998 | Masaki et al. ................. 349/110 |
| 7,136,125 | B2 * | 11/2006 | Nakamura et al. ............ 349/114 |
| 2003/0007114 | A1 * | 1/2003 | Kim et al. ..................... 349/113 |

* cited by examiner

*Primary Examiner* — David Nelms
*Assistant Examiner* — Phu Vu
(74) *Attorney, Agent, or Firm* — Brinks Hofer Gilson & Lione (57) ABSTRACT

A transreflective liquid crystal display and a method of manufacturing the same are disclosed. The transreflective liquid crystal display includes a first insulating substrate; a color filter substrate including at least four color filters constituting a unit pixel formed on the first insulating substrate, the color filter substrate representing colors using light coming from outside; a second insulating substrate; a thin film transistor substrate facing the color filter substrate, the thin film transistor substrate including a thin film transistor, a light transmitting electrode, and a light reflective electrode sequentially formed on the second insulating substrate; a light transmitting hole formed in at least one of the color filters at a location corresponding to the light reflective electrode; and a liquid crystal layer interposed between the color filter substrate and the thin film transistor substrate.

6 Claims, 11 Drawing Sheets

TRANSREFLECTIVE LIQUID CRYSTAL DISPLAY AND METHOD OF MANUFACTURING THE SAME

This non-provisional application claims the benefit of Korea Patent Application No. 10-2007-088458 filed on Aug. 31, 2007, which is incorporated herein by reference for all purposes as if fully set forth herein.

BACKGROUND OF THE INVENTION

1. Field of the Invention

An exemplary embodiment relates to a flat panel display device, and more particularly, to a transreflective liquid crystal display and a method of manufacturing the same.

2. Discussion of the Related Art

With development of information technology, the use of image display devices such as televisions, computer monitors and notebooks has been increased. Cathode ray tubes (CRTs) had been mainly used as the image display devices, but it is very difficult to manufacture them thinly and lightly.

Accordingly, the cathode ray tubes have been replaced by flat panel display devices such as a liquid crystal display (LCD), a plasma display panel (PDP), and an organic light emitting device (OLED). Out of the flat panel display devices, the liquid crystal display has been widely used because the high resolution of the liquid crystal display can be achieved and the large-sized liquid crystal display as well as the small-sized liquid crystal display can be manufactured.

The liquid crystal display includes a color filter substrate, a thin film transistor substrate, and a liquid crystal layer interposed between the two substrates. The color filter substrate may include a first insulating substrate, a black matrix, and red, green, and blue color filters formed on the first insulating substrate. The thin film transistor substrate may include a second insulating substrate, a thin film transistor and a pixel electrode formed on the second insulating substrate. Herein the pixel electrode functions as a light transmissive electrode.

The liquid crystal display having the above-described configuration may be classified into a twisted nematic (TN) mode LCD, a vertically aligned (VA) mode LCD, and an in-plane switching (IPS) mode LCD depending on a manner for driving the liquid crystal layer. In the TN, VA, and IPS mode LCDs, the disposition and structure of electrodes for driving the liquid crystal layer are different from one another.

For instance, a common electrode for driving the liquid crystal layer is formed on the color filter substrate in the TN and VA mode LCDs, while the common electrode is formed on the thin film transistor substrate in the IPS mode LCD. Further, the common electrode is formed in the form of one plate in the TN mode LCD, while the common electrode is formed in the form of a plurality of plates in the IPS mode LCD. Furthermore, in the IPS mode LCD, each of the plates has a predetermined shape and is spaced apart from a neighboring plate at a predetermined interval.

The TN, VA, and IPS mode liquid crystal displays may be manufactured as a transreflective liquid crystal display. In the transreflective liquid crystal display, a plurality of sub-pixels constituting a unit pixel, namely, red, green, and blue color filters each includes a light transmitting area and a light reflective area. Therefore, the light transmitting area transmits light in a transmitting mode, and the light reflective area reflects and transmits light in a reflective mode.

The transreflective liquid crystal display includes a light reflective electrode formed at a location corresponding to the light reflective area, and the light reflective electrode is generally positioned on the thin film transistor substrate.

A principle in which a color of an image displayed by the transreflective liquid crystal display is achieved is schematically described as follows.

First, in the transmitting mode, after backlight light from a backlight unit on a rear surface of the transreflective liquid crystal display passes through the liquid crystal layer in the light transmitting area, the red, green, and blue color filters of the color filter substrate transmit the backlight light. The displayed image can represent various colors by carrying out additive mixture of color stimuli on the backlight light transmitted by the red, green, and blue color filters.

On the other hand, in the reflective mode, after the red, green, and blue color filters transmit external light such as solar light in the light reflective area, the external light passes through the liquid crystal layer and then is reflected by the light reflective electrode. After the external light reflected by the light reflective electrode again passes through the liquid crystal layer as well as the red, green, and blue color filters. The displayed image can represent various colors by carrying out additive mixture of color stimuli on the external light transmitted by the red, green, and blue color filters.

As described above, the red, green, and blue color filters once transmit the backlight light in the light transmitting area, the red, green, and blue color filters twice transmit the external light in the light reflective area. Therefore, light transmittance in the light reflective area is relatively reduced. Hence, luminance in the light reflective area is relatively lower than a luminance in the light transmitting area.

SUMMARY

In one aspect, a transreflective liquid crystal display comprises a first insulating substrate, a color filter substrate including at least four color filters constituting a unit pixel formed on the first insulating substrate, the color filter substrate representing colors using light coming from outside, a second insulating substrate, a thin film transistor substrate facing the color filter substrate, the thin film transistor substrate including a thin film transistor, a light transmitting electrode, and a light reflective electrode sequentially formed on the second insulating substrate, a light transmitting hole formed in at least one of the color filters at a location corresponding to the light reflective electrode, and a liquid crystal layer interposed between the color filter substrate and the thin film transistor substrate.

In another aspect, a method of manufacturing a transreflective liquid crystal display comprises providing a color filter substrate including a black matrix, at least four color filters constituting a unit pixel, and a column spacer that are formed on a first insulating substrate, providing a thin film transistor substrate including a thin film transistor on a second insulating substrate, a light transmitting electrode, and a light reflective electrode, and interposing a liquid crystal layer between the color filter substrate and the thin film transistor substrate, wherein a light transmitting hole is formed in at least one color filter at a location corresponding to the light reflective electrode.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail embodiments of the invention examples of which are illustrated in the accompanying drawings.

Although a transreflective liquid crystal display and a method of manufacturing the same according to an exemplary embodiment of the invention are described using a twisted nematic (TN) mode liquid crystal display as an example, the exemplary embodiment of the invention is not limited thereto. For example, the transreflective liquid crystal display and the method of manufacturing the same according to the exemplary embodiment of the invention may be applied to a vertically aligned (VA) mode liquid crystal display and an in-plane switching (IPS) mode liquid crystal display.

Further, although the transreflective liquid crystal display and the method of manufacturing the same according to the exemplary embodiment of the invention are described using the case where a plurality of sub-pixels constituting a unit pixel, namely, a plurality of color filters include red, green, blue, and white color filters as an example, the exemplary embodiment of the invention is not limited thereto. For example, in the transreflective liquid crystal display and the method of manufacturing the same according to the exemplary embodiment of the invention, the plurality of sub-pixels may further include another color filter in addition to the red, green, blue, and white color filters. Furthermore, instead of at least one of the red, green, blue, and white color filters, the plurality of sub-pixels may include another color filter.

Figure 1:
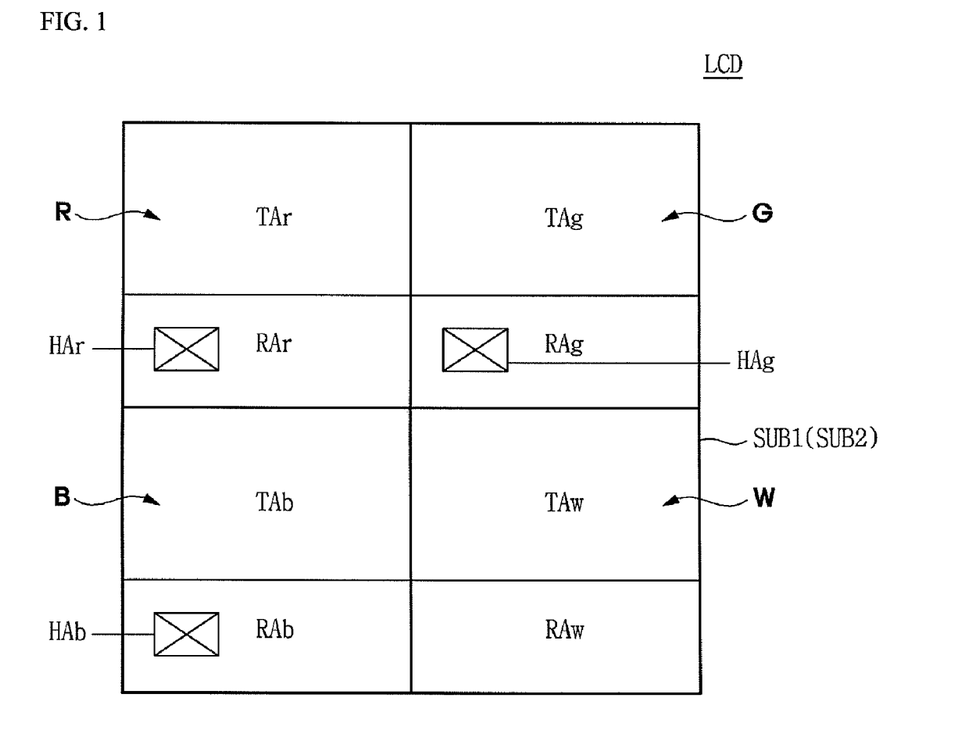
FIG. 1 schematically shows a unit pixel of a transreflective liquid crystal display according to an exemplary embodiment of the invention.

FIG. 1 schematically shows a unit pixel of a transreflective liquid crystal display according to an exemplary embodiment of the invention.

As shown in FIG. 1, the transreflective liquid crystal display LCD according to the exemplary embodiment of the invention includes a first insulating substrate SUS1 formed of a transparent material such as glass or plastic, and red, green, blue, and white color filters, namely, red, green, blue, and white sub-pixels R, G, B, and W constituting a unit pixel on the first insulating substrate SUS1. The transreflective liquid crystal display LCD may further includes a second insulating substrate SUS2 facing the first insulating substrate SUS1, and a liquid crystal layer (not shown) interposed between the first and second insulating substrates SUS1 and SUS2. The second insulating substrate SUS2 may be formed of a transparent material such as glass or plastic. A light reflective electrode (not shown) may be formed on the second insulating substrate SUS2. This will be described later with reference to FIGS. 2 and 3.

Each of the red, green, blue, and white sub-pixels R, G, B, and W may include light transmitting areas TAr, TAg, TAb, and Taw, and light reflective areas RAr, RAg, RAb, and RAw.

Light transmitting holes HAr, HAg, and HAb may be formed in at least one of the light reflective areas RAr, RAg, RAb, and Raw. For example, the red, green, and blue sub-pixels R, G, and B may include the light transmitting holes HAr, HAg, and HAb, respectively. The light transmitting holes HAr, HAg, and HAb may have the same size, but the exemplary embodiment of the invention is not limited thereto. In other words, the light transmitting holes HAr, HAg, and HAb may have different sizes, and the size of the light transmitting holes may depend on specifications of the transreflective liquid crystal display.

At least one light transmitting holes HAr, HAg, and HAb formed in at least one of the light reflective areas RAr, RAg, RAb, and Raw can improve a light transmittance and a luminance of external light such as solar light. Further, because the transreflective liquid crystal display includes the white sub-pixel W in addition to the red, green, and blue sub-pixels R, G, and B, a light transmittance and a luminance of the light reflective areas RAr, RAg, RAb, and Raw can be further improved.

Figure 2:
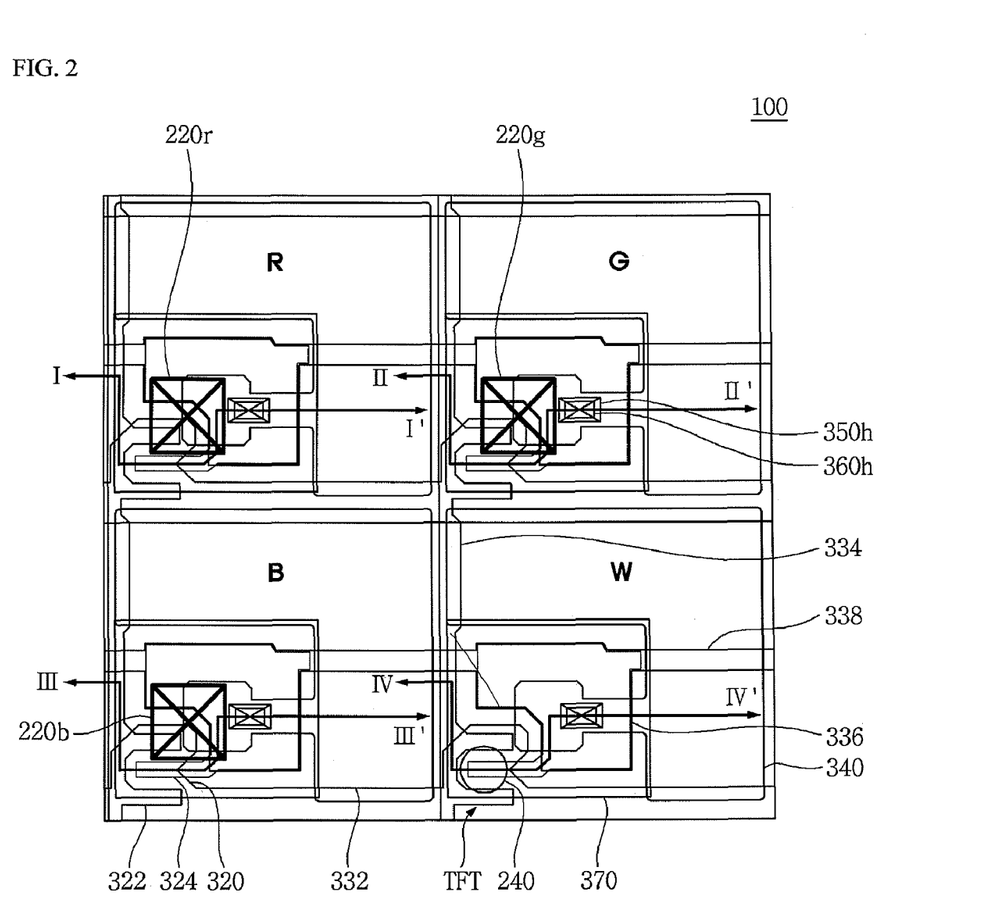
FIG. 2 is a plane view showing the unit pixel of the transreflective liquid crystal display.
Figure 3:
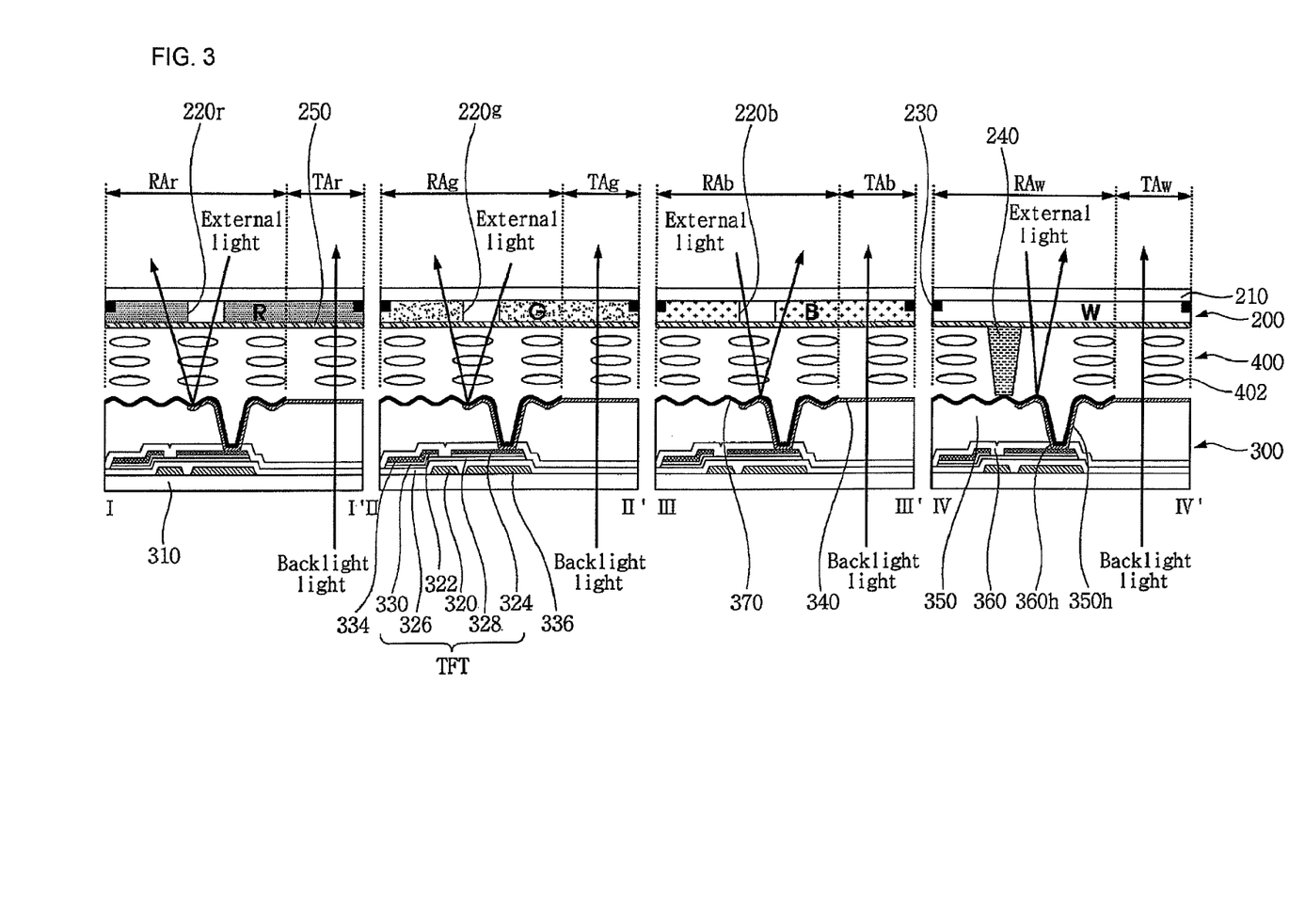
FIG. 3 is a cross-sectional view taken along lines I-I', II-II', III-III', and IV-IV' of FIG. 2.

FIG. 2 is a plane view showing the unit pixel of the transreflective liquid crystal display according to an exemplary embodiment of the present invention. FIG. 3 is a cross-sectional view taken along lines I-I', II-II', III-III', and IV-IV' of FIG. 2.

As shown in FIGS. 2 and 3, a transreflective liquid crystal display 100 according to the exemplary embodiment of the invention includes a color filter substrate 200, a thin film transistor substrate 300, and a liquid crystal layer 400.

The color filter substrate 200 can represent colors of an image to be displayed by the transreflective liquid crystal display 100 using external light coming from an upper portion of the color filter substrate 200 or backlight light coming from a lower portion of the thin film transistor substrate 300.

The color filter substrate 200 includes a first insulating substrate 210 and red, green, blue, and white color filters R, G, B, and W constituting a unit pixel on the first insulating substrate 210. The color filter substrate 200 may further include a black matrix 230 and a column spacer 240. The color filter substrate 200 may further include a common electrode 250.

The red, green, blue, and white color filters R, G, B, and W can represent colors using the external light or the backlight light. More specifically, various colors can be represented by carrying out additive mixture of color stimuli on red, green, and blue lights passing through each of the red, green, and blue color filters R, G, and B. Because the white color filter W may be formed of a transparent material so as to further increase a light transmittance and a luminance of the transreflective liquid crystal display 100, the white color filter W may substantially have a transparent color.

Light transmitting holes 220r, 220g, and 220b are formed in the light reflective areas RAr, RAg, and RAb of the red, green, and blue color filters R, G, and B, respectively. However, the light transmitting holes 220r, 220g, and 220b may be formed in only at least one of the red, green, and blue color filters R, G, and B.

Although the light transmitting holes 220r, 220g, and 220b formed in the red, green, and blue color filters R, G, and B have the same size in the exemplary embodiment, the light transmitting holes 220r, 220g, and 220b may have different sizes. For example, the size of the light transmitting hole 220g of the green color filter G may be larger than the size of the light transmitting hole 220r of the red color filter R, and the size of the light transmitting hole 220r may be larger than the size of the light transmitting hole 220b of the blue color filter B. A material forming the white color filter W may be filled in the light transmitting holes 220r, 220g, and 220b so as to secure the planarization of the common electrodes 250 on the red, green, blue, and white color filters R, G, B, and W.

The black matrix 230 does not allows the external light and the backlight light to pass through an area incapable of controlling the liquid crystal layer 400, thereby increasing the contrast characteristic of the transreflective liquid crystal display 100.

The column spacer 240 allows the color filter substrate 200 and the thin film transistor substrate 300 to be spaced apart from each other at a predetermined distance, for example, about 1 to 5 μm, thereby providing a space capable of interposing the liquid crystal layer 400 between the color filter substrate 200 and the thin film transistor substrate 300. One column spacer 240 is formed in each unit pixel, but the number of column spacers 240 may depend on the specifications of the transreflective liquid crystal display 100.

The common electrodes 250 supplies a common voltage received from outside to the liquid crystal layer 400. Because the common electrode 250 has to transmit the external light and the backlight light, the common electrode 250 is formed of a transparent material such as indium tin oxide (ITO) or indium zinc oxide (IZO). The common electrode 250 may be formed on the color filter substrate 200 or the thin film transistor substrate 300 depending on the mode of the transreflective liquid crystal display 100.

The thin film transistor substrate 300 includes a second insulating substrate 310, a thin film transistor TFT, a light transmitting electrode 340, and a light reflective electrode 370 sequentially formed on the second insulating substrate 310.

The thin film transistor TFT is used as a switching element for an active matrix (AM) drive. The thin film transistor TFT includes a gate electrode 320, a source electrode 322, a drain electrode 324, a gate insulating layer 326, an active layer 328, and an ohmic contact layer 330. The thin film transistor TFT is formed at each crossing of gate lines 332 and data lines 334 and supplies a data voltage received through the data lines 334 to the light transmitting electrode 340 as a pixel electrode. Although the thin film transistor TFT has an inverted staggered structure, the exemplary embodiment is not limited thereto. For example, the thin film transistor TFT may have at least one of a coplanar structure, a staggered structure, and an inverted coplanar structure. Reference numerals 336 and 338 FIGS. 2 and 3 indicate a storage electrode and a storage line, respectively.

The light transmitting electrode 340 is electrically connected to the drain electrode 324 through contact holes 350h and 360h that pass through an organic protective layer 350 and an inorganic protective layer 360, respectively. The light transmitting electrodes 340 are formed at locations corresponding to the light transmitting areas TAr, TAg, TAb, and Taw, but may be formed at a portion or all of locations corresponding to the light reflective areas RAr, RAg, RAb, and Raw. Because the light transmitting electrode 340 has to transmit the backlight light, the light transmitting electrode 340 is formed of a transparent material such as indium tin oxide (ITO) or indium zinc oxide (IZO).

The light reflective electrode 370 is formed on the light transmitting electrode 340 to be electrically connected to the light transmitting electrode 340. The light reflective electrode 370 may be formed at locations corresponding to the light reflective areas RAr, RAg, RAb, and Raw. Because the light reflective electrode 370 has to reflect the external light, the light reflective electrode 370 is formed of a metal having a high light reflectance, for example, at least one of aluminum (Al), molybdenum (Mo), titanium (Ti), gold (Au), silver (Ag), palladium (Pd), or a combination thereof. The surface of organic protective layer 350 formed at a location corresponding to the light reflective electrode 370 may be formed in the embossing form so as to diffuse and reflect the external light reflected by the light reflective electrode 370. Hence, the light reflective electrode 370 also may be formed in the embossing form.

The liquid crystal layer 400 is interposed between the color filter substrate 200 and the thin film transistor substrate 300, and is consist of liquid crystal molecules 402. The liquid crystal layer 400 may be sealed by a sealant (not shown) to attach the color filter substrate 200 to the thin film transistor substrate 300.

A traveling path of the backlight light and the external light in the light transmitting areas TAr, TAg, TAb, and Taw and the light reflective areas RAr, RAg, RAb, and Raw will be described as follows.

First, in a transmitting mode, after the backlight light passes through the thin film transistor substrate 300 in the light transmitting areas TAr, TAg, TAb, and Taw, the backlight light passes through the liquid crystal layer 400. And then, the backlight light passes through the common electrode 250, the red, green, and blue color filters R, G, and B, and the first insulating substrate 210 sequentially. The displayed image can represent various colors by carrying out additive mixture of color stimuli on the backlight light transmitted by the first insulating substrate 210. It is a matter of course that the white color filter W can transmit the backlight light.

On the other hand, in a reflective mode, after the external light passes through the first insulating substrate 210, the light transmitting holes 220r, 220g, and 220b in the light reflective areas RAr, RAg, RAb, and Raw, and the common electrode 250 sequentially, the external light passes through the liquid crystal layer 400. After the external light passing through the liquid crystal layer 400 is reflected by the light reflective electrode 370, the external light again passes through the liquid crystal layer 400. Next, the external light passes the common electrode 250, the red, green, and blue color filters R, G, and B, and the first insulating substrate 210 sequentially. The displayed image can represent various colors by carrying out additive mixture of color stimuli on the external light transmitted by the first insulating substrate 210. It is a matter of course that the white color filter W can transmit the external light.

As described above, because the light transmitting holes 220r, 220g, and 220b are respectively formed in the red, green, and blue color filters R, G, and B at locations corresponding to the light reflective areas RAr, RAg, RAb, and Raw, the red, green, and blue color filters R, G, and B can once transmit the external light in the reflective mode.

Accordingly, because the loss of light is reduced by a reduction in the number of transmitting operations of each of the red, green, and blue color filters R, G, and B, the light transmittance and the luminance of the light reflective areas RAr, RAg, RAb, and Raw can be improved. Further, because the transreflective liquid crystal display 100 further includes the white color filter W in addition to the red, green, and blue color filters R, G, and B, the light transmittance and the luminance of the light reflective areas RAr, RAg, RAb, and Raw can be further improved.

The transreflective liquid crystal display 100 is manufactured by providing the color filter substrate 200 and the thin film transistor substrate 300 and then interposing the liquid crystal layer 400 between the color filter substrate 200 and the thin film transistor substrate 300. A method of manufacturing the transreflective liquid crystal display 100 will be described in detail with reference to FIGS. 4A to 4H.

FIGS. 4A to 4H are cross-sectional views showing each stage in a method of manufacturing the transreflective liquid crystal display. More specifically, FIGS. 4A to 4E are cross-sectional views showing each stage in a method of manufacturing the color filter substrate.

Figure 4A:
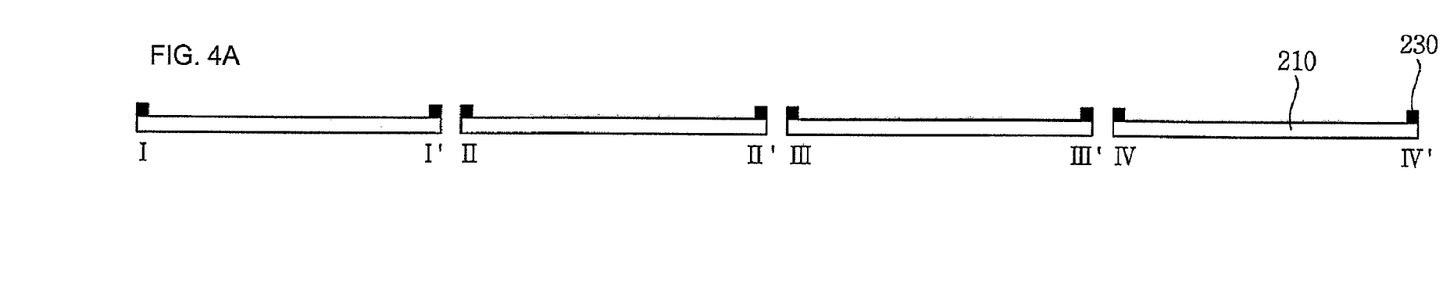
FIGS. 4A to 4H are cross-sectional views showing each stage in a method of manufacturing the transreflective liquid crystal display.

First, as shown in FIG. 4A, the first insulating substrate 210 is provided, and then the black matrix 230 is formed on a portion of the first insulating substrate 210.

In case the black matrix 230 is formed of a metal material, the black matrix 230 is formed through a deposition process of the metal material and a succeeding photolithographic process. In case the black matrix 230 is formed of an organic material, the black matrix 230 is formed through a coating process of an organic material for black matrix and a succeeding photolithography process.

Figure 4B:
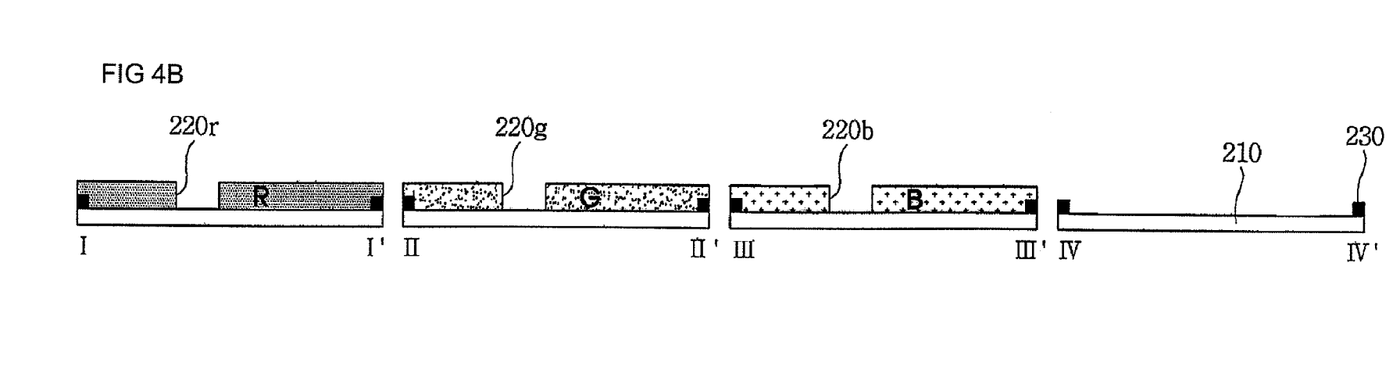

Next, as shown in FIG. 4B, the red, green, and blue color filters R, G, and B respectively having the light transmitting holes 220r, 220g, and 220b are formed on the first insulating substrate 210 on which the black matrix 230 is formed.

The red, green, and blue color filters R, G, and B are formed through a coating process of red, green, and blue pigments and a succeeding photolithography process. The formation order of the red, green, and blue color filters R, G, and B is not particularly restricted.

Figure 4C:
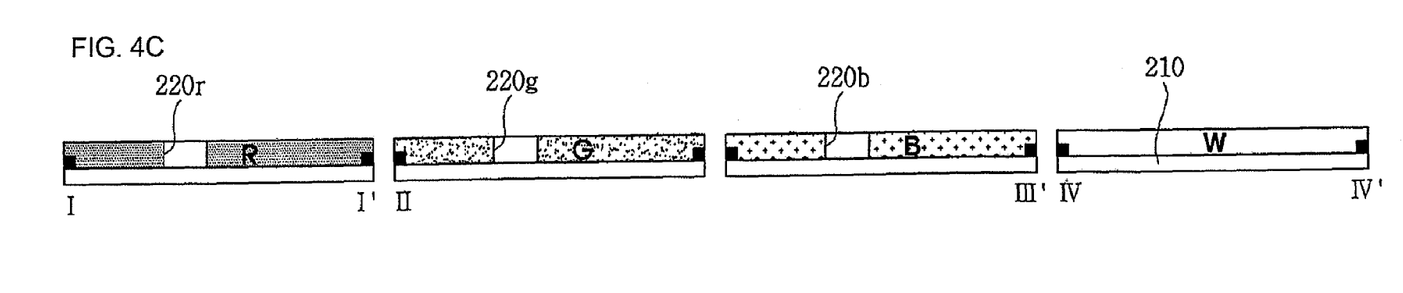

Next, as shown in FIG. 4C, the white color filter W is formed on the first insulating substrate 210 on which the red, green, and blue color filters R, G, and B are formed.

The white color filter W is formed of a transparent organic material processed by a photolithography process. In other words, the white color filter W is formed through a coating process of the transparent organic material and a succeeding photolithography process. The same organic material as the white color filter W may be filled in the light transmitting holes 220r, 220g, and 220b of the red, green, and blue color filters R, G, and B so as to secure the planarization of the common electrodes 250 to be formed on the red, green, blue, and white color filters R, G, B, and W.

Figure 4D:
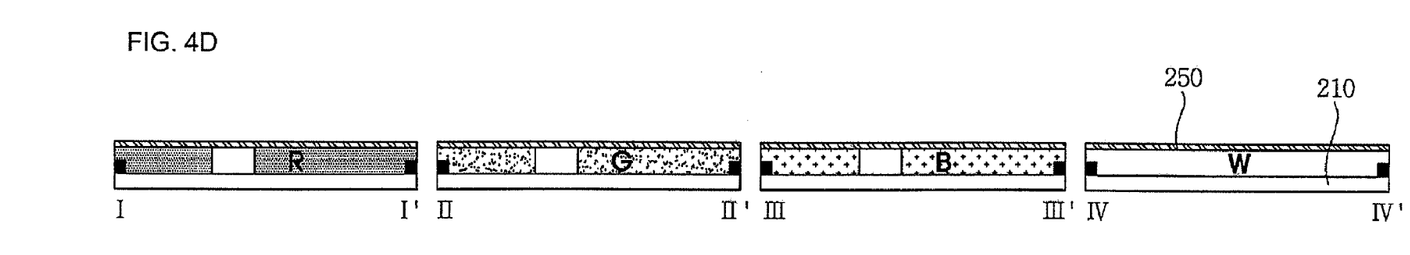

Next, as shown in FIG. 4D, the common electrode 250 is formed on the first insulating substrate 210 on which the white color filter W is formed.

The common electrode 250 is formed through a deposition process of a transparent material such as indium tin oxide (ITO) or indium zinc oxide (IZO) and a succeeding photolithography process. The common electrode 250 may not be formed on the color filter substrate 200 depending on the mode of the transreflective liquid crystal display 100.

Figure 4E:
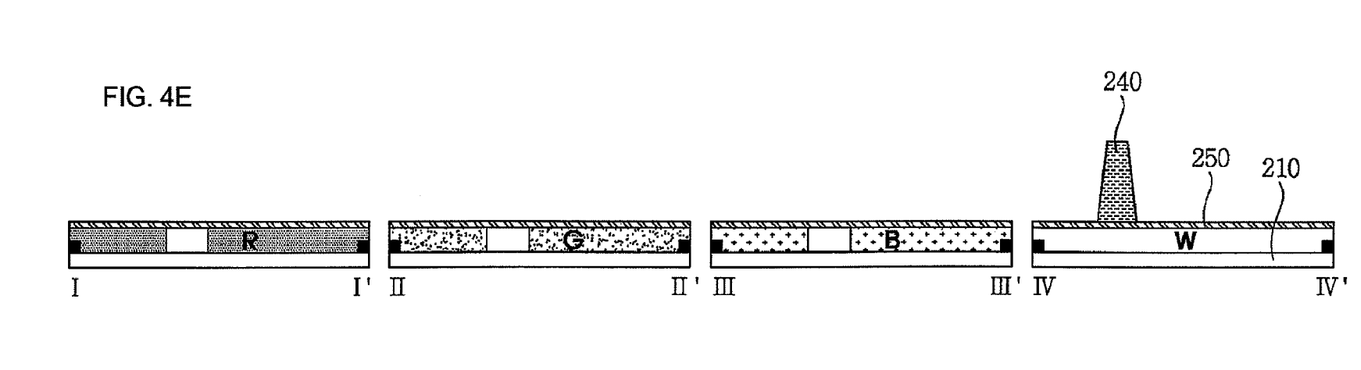

Next, as shown in FIG. 4E, the column spacer 240 is formed on the first insulating substrate 210 on which the common electrode 250 is formed.

The column spacer 240 is formed through a deposition process of an organic material for column spacer and a succeeding photo process. The column spacer 240 may not be formed on the color filter substrate 200 depending on the mode of the transreflective liquid crystal display 100.

Figure 4F:
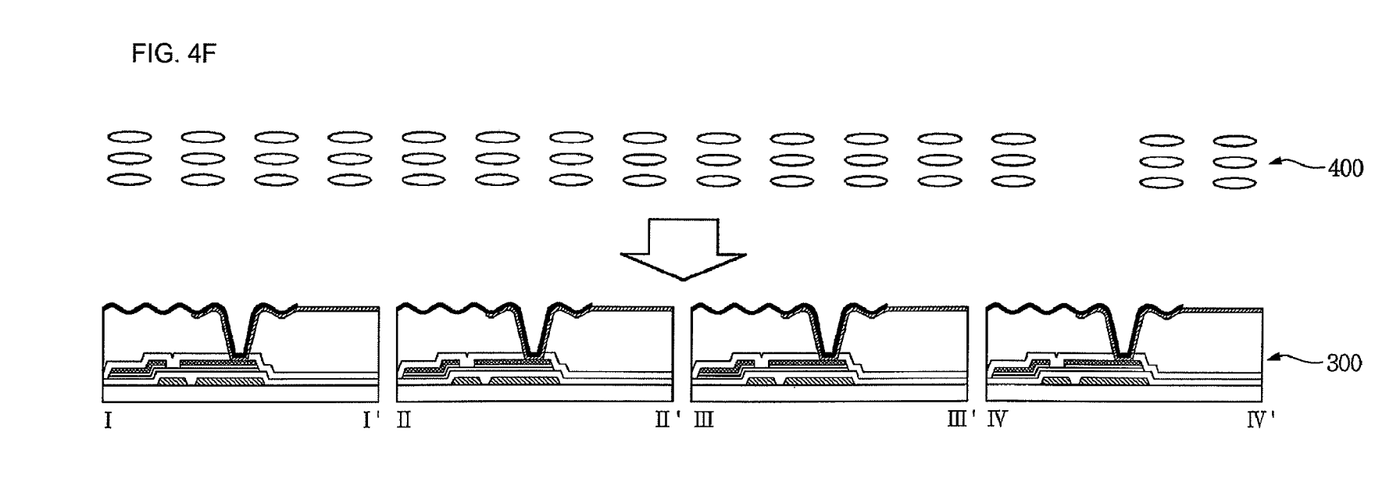

Next, as shown in FIG. 4F, the liquid crystal layer 400 is formed on the thin film transistor 300 that is previously provided. The sealant (not shown) is applied to the color filter substrate 200 or the thin film transistor 300.

A one drop fill (ODF) process may be used to form the liquid crystal layer 400 on the thin film transistor 300. The liquid crystal layer 400 may be formed on not the thin film transistor 300 but the color filter substrate 200.

Figure 4G:
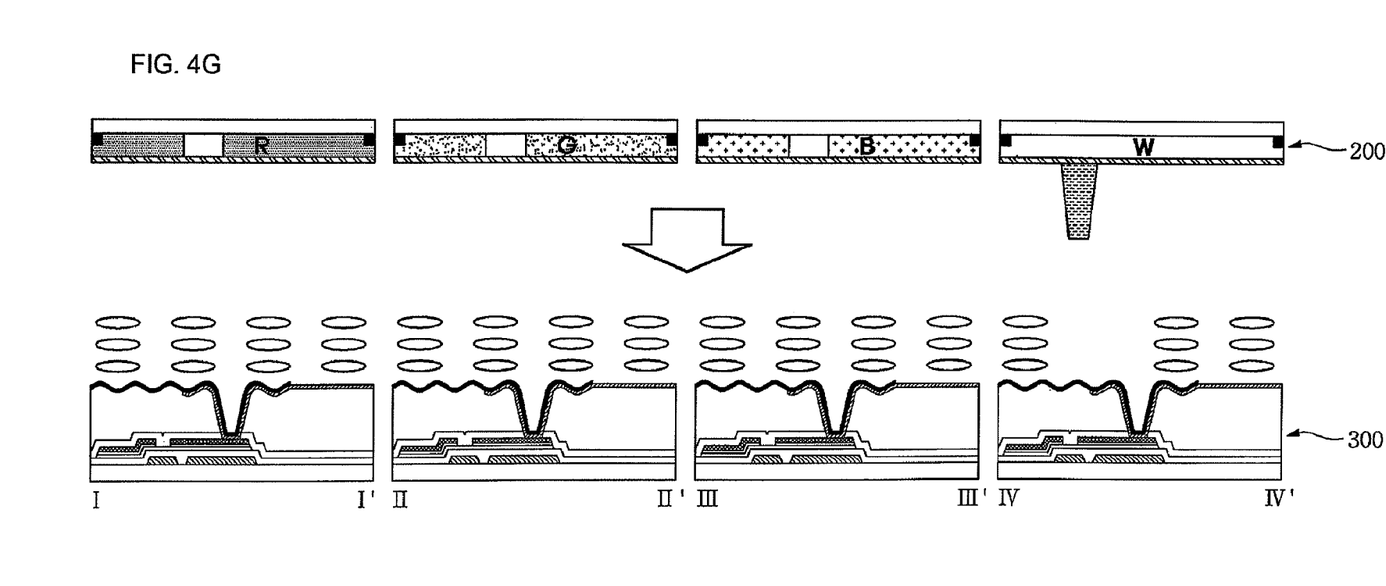

Next, as shown in FIG. 4G, the color filter substrate 200 faces the thin film transistor 300.

Figure 4H:
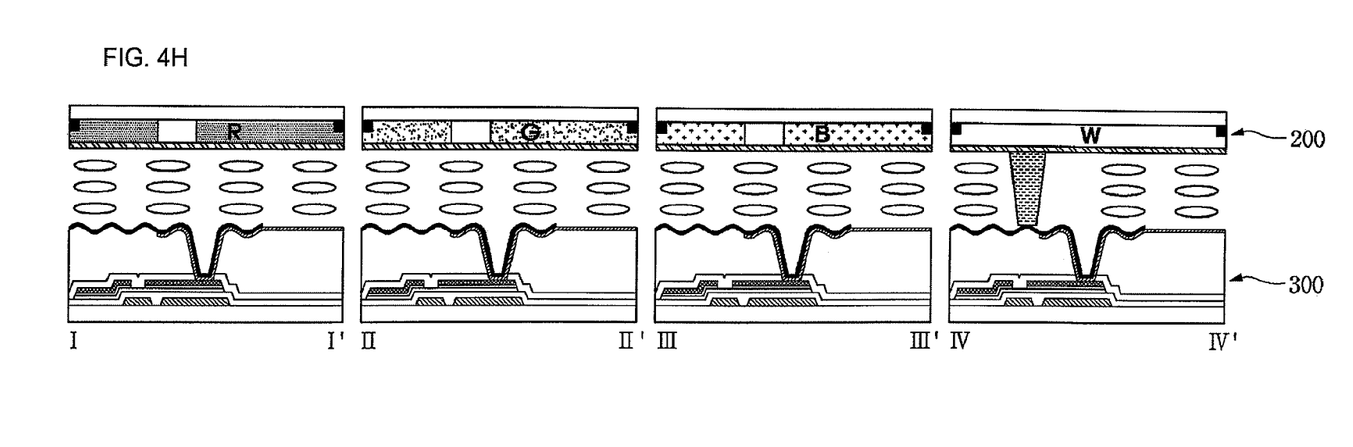

Next, as shown in FIG. 4H, a vacuum attaching process and a sealant hardening process, and the like, are performed on the color filter substrate 200 and the thin film transistor 300 to manufacture the transreflective liquid crystal display 100.

As described above, because the light transmitting holes 220r, 220g, and 220b are respectively formed in the red, green, and the blue color filters R, G, and B in the method of manufacturing the transreflective liquid crystal display 100 according to the exemplary embodiment of the invention, the light transmittance and the luminance of the light reflective areas RAr, RAg, RAb, and Raw can be improved. Furthermore, because the white color filter W is formed in addition to the red, green, and the blue color filters R, G, and B, the light transmittance and the luminance of the light reflective areas RAr, RAg, RAb, and Raw can be further improved. Furthermore, because the white color filter W in addition to the red, green, and the blue color filters R, G, and B participate in constituting the unit pixel, the light transmittance and the luminance of the light reflective areas RAr, RAg, RAb, and Raw can be further improved.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A transreflective liquid crystal display comprising:
   a first insulating substrate;
   a color filter substrate including at least four color filters constituting a unit pixel formed on the first insulating substrate, the color filter substrate representing colors using light coming from outside;
   a second insulating substrate;
   a thin film transistor substrate facing the color filter substrate, the thin film transistor substrate including a thin film transistor, a light transmitting electrode, and a light reflective electrode, each of the thin film transistor, the light transmitting electrode, and the light reflective electrode sequentially forming a respective, distinct layer disposed on the second insulating substrate;
   a light transmitting hole formed in at least one of the color filters at a location corresponding to the light reflective electrode; and
   a liquid crystal layer interposed between the color filter substrate and the thin film transistor substrate,
   wherein the at least four color filters include red, green, blue, and white color filters,
   the light transmitting hole is formed in the red, green, and blue color filters, respectively, and
   a size of the light transmission hole of the green color filter is larger than a size of the light transmitting hole of the red color filter, and the size of the light transmitting hole of the red color filter is larger than a size of the light transmitting hole of the blue color filter.

2. The transreflective liquid crystal display of claim 1, wherein a material for forming the white color filter is filled in each of the light transmitting holes formed in the red, green, and blue color filters.

3. A method of manufacturing a transreflective liquid crystal display comprising:
   providing a first insulating substrate;
   providing a color filter substrate including at least four color filters, that constitute a unit pixel on the first insulating substrate;
   providing a second insulating substrate; and
   providing a thin film transistor substrate including a thin film transistor, a light transmitting electrode, and a light reflective electrode, each of the thin film transistor, the light transmitting electrode, and the light reflective electrode sequentially forming a respective, distinct layer disposed on the second insulating substrate, wherein the at least four color filters include red, green, blue, and white color filters, a light transmitting hole is formed in the red, green, and blue color filters, respectively, and a size of the light transmission hole of the green color filter is larger than a size of the light transmitting hole of the red color filter, and the size of the light transmitting hole of the red color filter is larger than a size of the light transmitting hole of the blue color filter.

4. The method of claim 3, wherein a material for forming the white color filter is filled in each of the light transmitting holes formed in the red, green, and blue color filters.

5. The transreflective liquid crystal display of claim 1, wherein the light reflective electrode is formed on the light transmitting electrode at an entire area in the transmission hole.

6. The method of claim 3, wherein the light reflective electrode is formed on the light transmitting electrode at an entire area in the transmission hole.

\* \* \* \* \*